United States Patent [19]

Welburn

[11] Patent Number: 4,458,168
[45] Date of Patent: Jul. 3, 1984

[54] TOOTHED RELUCTANCE SYNCHRO/RESOLVER

[75] Inventor: Ross D. Welburn, Santa Rosa, Calif.

[73] Assignee: Motornetics Corporation, Santa Rosa, Calif.

[21] Appl. No.: 531,292

[22] Filed: Sep. 12, 1983

[51] Int. Cl.³ .......................... H02K 1/00; H01F 21/00
[52] U.S. Cl. ..................................... 310/185; 336/120; 310/261; 310/254
[58] Field of Search .............. 310/254, 261, 264, 266, 310/218, 179, 180, 184, 185, 168, 171; 336/120

[56] References Cited

U.S. PATENT DOCUMENTS 3,128,044 · 4/1964 Packard .......................... 336/120 X
3,777,296 12/1973 Ohyama ................................ 336/120

FOREIGN PATENT DOCUMENTS 1,081,879 12/1954 France .................................. 336/120
235187 5/1969 U.S.S.R. .............................. 336/120

Primary Examiner—Mark O. Budd
Attorney, Agent, or Firm—Philip M. Shaw, Jr.

[57] ABSTRACT

A synchro/resolver in which a plurality of primary windings and secondary windings are wound on separate stator pole pieces having projecting teeth, with the stator poles of the secondary windings being located between the stator pole pieces of the primary windings and further including a rotor with teeth which are juxtaposed to the stator teeth for differentially coupling magnetic flux generated in the primary windings to the secondary windings as a function of the position of the rotor's teeth vis-a-vis the stators' teeth.

6 Claims, 3 Drawing Figures

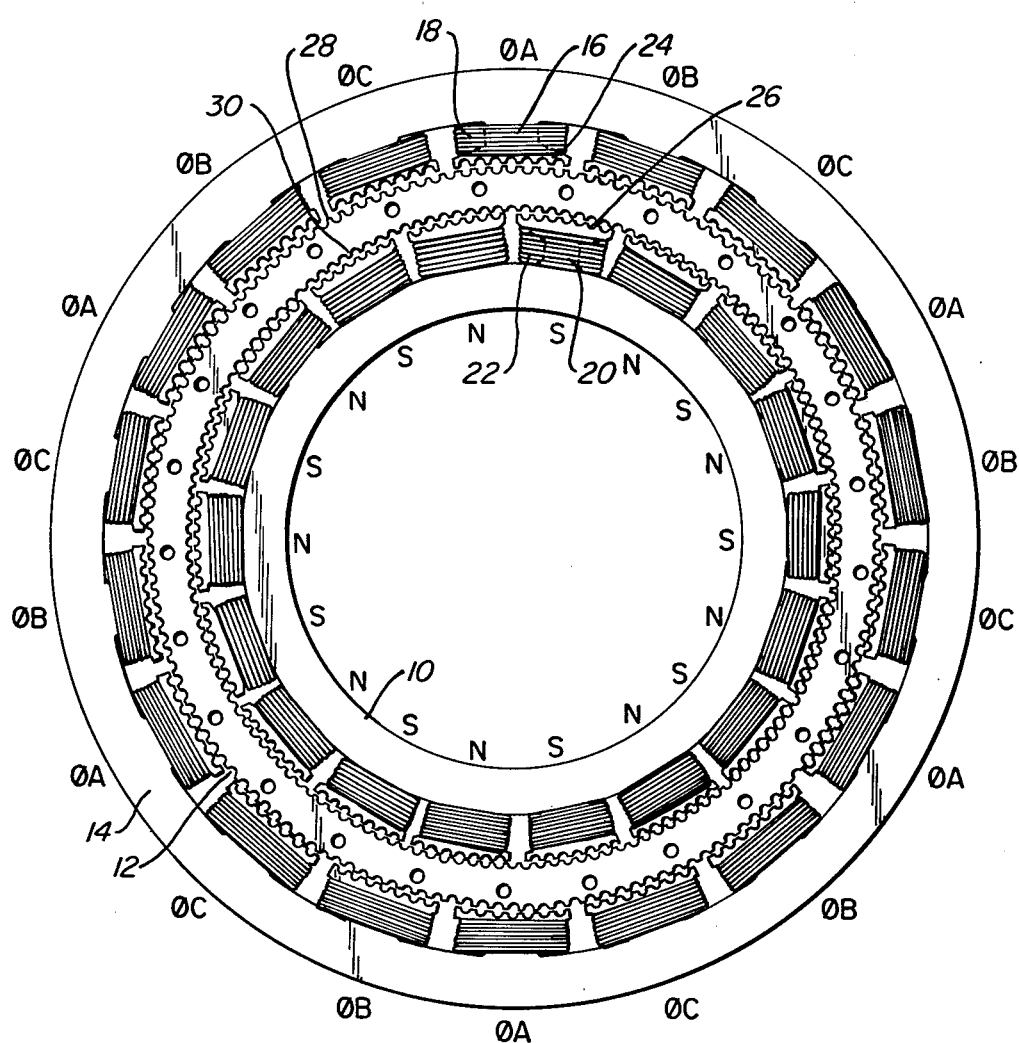
FIG.—1.

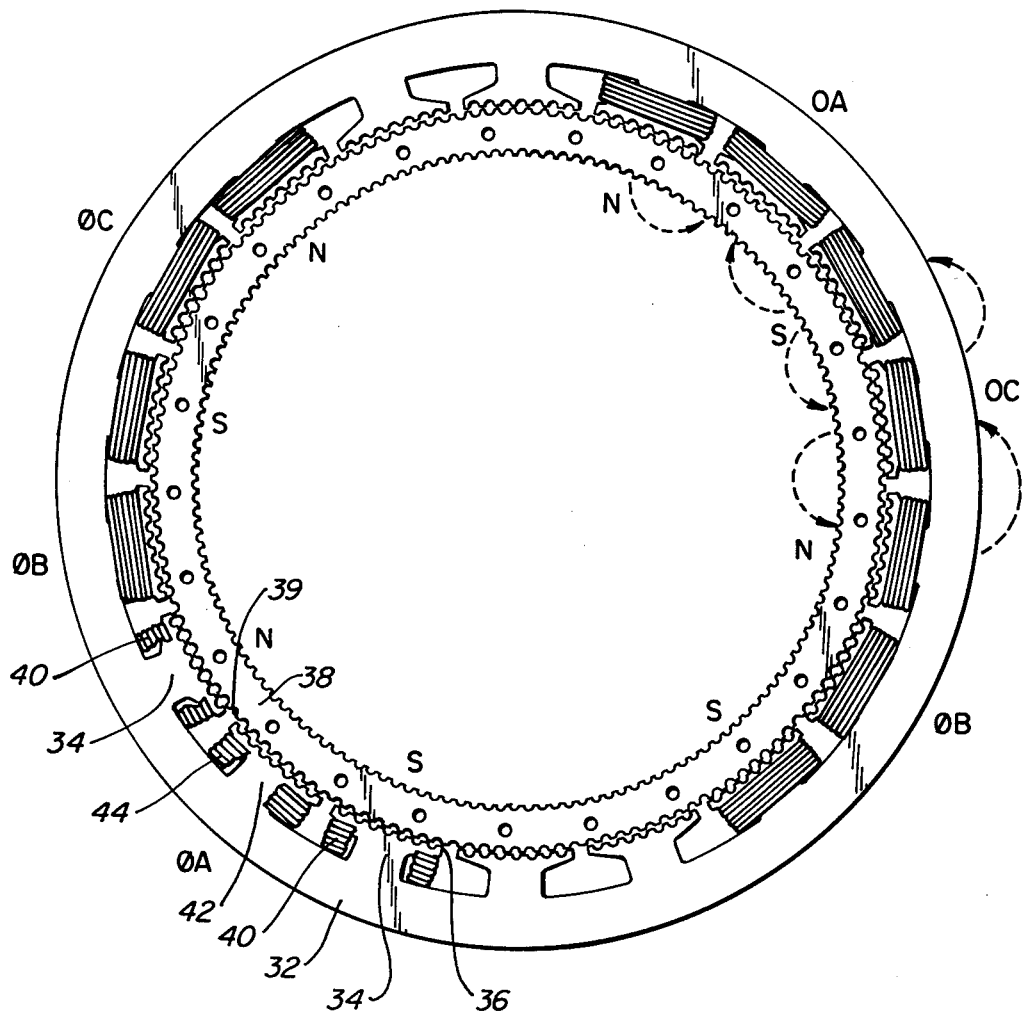
FIG._2.

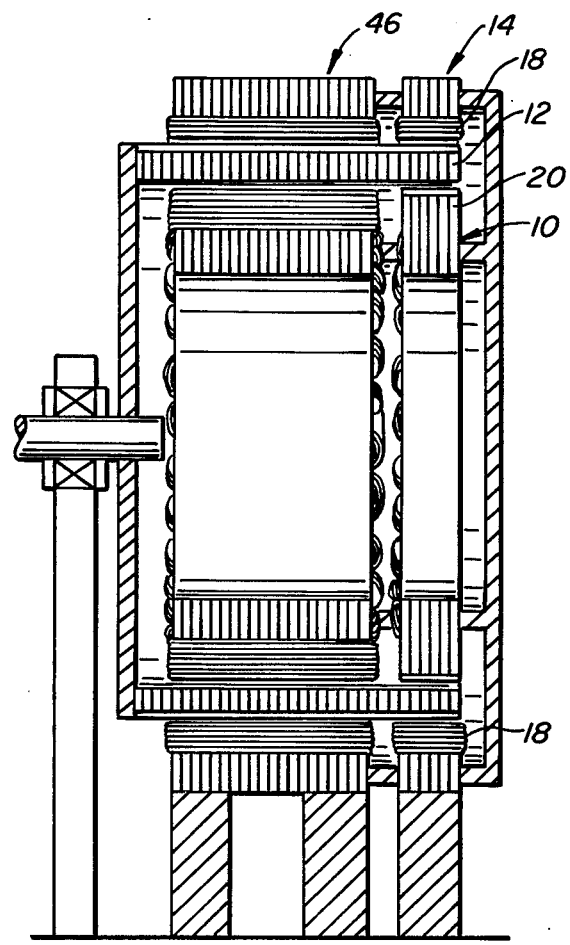
FIG._3.

TOOTHED RELUCTANCE SYNCHRO/RESOLVER

DESCRIPTION

1. Technical Field

This invention relates to a high resolution synchro/resolver and more particularly to a synchro/resolver for use with a toothed reluctance motor. It can also be used as an independent positioning device.

2. Background Art

Conventional synchro/resolvers have a magnetic structure which is carefully designed to minimize distortion while being operated at low current levels. Furthermore, most conventional resolvers are designed for a low speed operation, that is, one electrical cycle per mechanical revolution. To have a high speed resolver, many poles must be wound. There is a limit, however, to how many windings will physically fit on the winding form.

Still another consideration with conventional resolvers is manufacturing cost. Where the resolver is to be used in conjunction with a particular motor it is desirable to use the same winding form structure for the resolver as is used for the motor.

DISCLOSURE OF INVENTION

The above problems of conventional synchro/resolvers are overcome by the present invention of a transducing apparatus which comprises a stator assembly having a succession of pole pieces, each pole piece having a plurality of spaced-apart pole piece teeth, a rotor having a plurality of teeth juxtaposed to the stator teeth, a plurality of primary windings, each being wound on a separate stator pole piece in such a fashion as to induce alternately polarized magnetic fields in each successive pole piece on which a primary winding is wound, and a plurality of secondary windings, each being wound on a separate stator pole piece intermediate the stator pole pieces on which the primary windings are wound. These secondary windings act as sensing coils for the synchro/resolver.

The synchro/resolver of the present invention enjoys a number of advantages over conventional synchro/resolvers.

The stator assembly and rotor assembly are the same laminations as are used in making the motor. A winding is not required for every pole because the magnetic field in each pole is multiplied by the interaction of the rotor and stator teeth. With this design it is possible to have a much higher resolution resolver without the cost of adding more windings. The resolver of the present invention also has the advantages of no brushes or slip rings. A conventional synchro of this resolution would require 300 pole windings for each of the 3 phases for a total of 900 pole windings. Totally impractical for 6 inch diameter.

In one embodiment of the invention the stator assembly is comprised of a first set and a second set of pole pieces, each in an annular configuration with an annular rotor concentrically interposed between the first and second stator assembly sets. Thus, the stator assembly and the rotors are all aligned coaxially and with the primary windings being wound on the inner stator assembly and the secondary windings being wound on the outer stator assembly. The angular orientation of the outer stator poles is such as to fall between the inner stator poles. In another embodiment of the invention, only a single outer stator assembly is utilized in conjunction with the rotor. In this arrangement every other stator pole piece has a primary winding and every other stator pole piece has a secondary winding.

It is a further object of the invention to provide a synchro/resolver which is relatively immune to distortion.

It is another object of the invention to provide a high speed synchro/resolver with a minimum number of pole windings.

It is yet a further object of the invention to provide a synchro/resolver having the same laminae as are used in the motor to which the synchro/resolver is connected.

It is still another object of the invention to provide a synchro/resolver having no brushes or slip rings.

The foregoing and other objectives, features and advantages of the invention will be more readily understood upon consideration of the following detailed description of certain preferred embodiments of the invention, taken in conjunction with the accompanying drawings.

BRIEF DESCRIPTION OF THE DRAWINGS

FIG. 1 is a plan diagram showing a lamina and winding coil structure of a first embodiment of the invention.

FIG. 2 is a plan diagram showing a lamina and winding coil arrangement of a second embodiment of the invention.

FIG. 3 is a vertical, sectional view of the synchro/resolver of the invention when coupled to a motor of similar construction.

BEST MODE FOR CARRYING OUT THE INVENTION

Referring now more particularly to FIG. 1, the plan views of the stator and rotor laminae which make up the synchro/resolver of the invention are illustrated. It will be appreciated that the structure of this synchro/resolver is the same in concept as that used in the synchronous motor disclosed in the applicant's co-pending application Ser. No. 385,034, filed June 4, 1982 and entitled "High Torque Robot Motor." Basically the resolver is made up of a stack of annular shaped inner stator laminae 10 which are coaxially surrounded by a stack of annular rotor laminae 12, which, in turn, are coaxially surrounded by a stack of annular, outer stator laminae 14. The rotor 12 is rotatably mounted between the inner stack 10 and the outer stack 14 as is described more fully in the applicant's above-identified co-pending application and as illustrated in FIG. 3. The outer stack 14 is comprised of a plurality of circumferentially arranged stator pole pieces 16, each of which is surrounded by a separate coil 18. The inner stator stack 10 has a plurality of circumferentially arranged stator pole pieces 20 each of which is surrounded by a separate coil 22. The coils 22 are alternately wound in different directions so that when current is applied to these coils 22 successive magnetic fields having opposite polarities will be generated around the circumference of the inner stator stack 10.

It will be noted that each stator pole 16 is aligned along radial lines passing between the stator poles 20 and that each pole 16 is provided with a plurality of teeth 24. Each pole piece 20 is provided with a plurality of pole piece teeth 26, and the outer and inner circumferences of the rotor 12 are each provided with separate corresponding sets of teeth 28 and 30, respectively. The spacing between the teeth 30 matches the spacing between the teeth 26 and the spacing between the teeth 28 matches the spacing between the teeth 24. The arrangement between stator poles 16 is such that the spacing between the teeth 24 on one stator pole 16 are an integral number of teeth plus one third of a tooth pitch from the teeth 24 of the next adjacent stator pole.

The coils 18 are secondary windings. They are connected to amplification and detection circuitry (not shown) which detects the magnitude and phase of the voltage appearing at the secondary winding to determine the position of the rotor.

In operation, because the current through the coils 22 is alternating, the flux will also alternate. This alternating current flux is coupled from the inside stator pole pieces 20, through the rotor 12 to the appropriate outside stator teeth 24. The outside stator pole 16 which has the most stator teeth engaged in common with the inside stator teeth 26 through the rotor 12 will receive the most flux. The maximum signal, therefore, on that particular phase of the secondary coils 18 will have the maximum signal. The secondary coils 18 are connected in three phases, denoted A, B and C. Only one phase winding at a time receives the maximum signal magnitude.

One important point is that the secondary windings 18 on the outside stator 14 pick up the signal differentially from the two corresponding inside primary windings 22. When phase A is completely lined up, that is, the teeth 28 of the rotor 12 are completely aligned with the teeth 24 of the stator pole pieces 16 corresponding to phase A, then the signal derived at the coil 18 of phase A will be zero because each of the two adjacent primary windings 22 will cancel each other out. When the teeth on the secondary winding 18 for phase A are totally misaligned, the output signal is also at null or zero. The signal picked up by the secondary winding 18 for any of the phases will only have any significant magnitude when one of the adjacent primary windings 22 is coupled through the rotor 12 to the secondary winding 18 more than the next adjacent primary winding 22 of the opposite polarity. This differential action minimizes the effect of the variable air gap since the gap affects both differen-tial primaries equally. The alignment between the inside stator 10 and the outside stator 14 is important but any local position errors are integrated out since many teeth, therefore many windings (in the case illustrated in FIG. 1, six windings), are averaging the signal. The primary of the synchro may be on the inside stator or the outside stator with equivalent results.

Referring now more particularly to FIG. 2, an alternative embodiment of the invention is illustrated which employs basically the same concept as the embodiment depicted in FIG. 1 except that only one stator is required, in this case the outside stator only, although it would work equally well with only an inside stator. The use of an outside stator is done for simplicity since it is more difficult and expensive to support an inside stator. Thus an outside stator is made up of a stack of laminae 32 each having a plurality of primary stator poles 34 arranged around the inner circumferential edge of the ring 32.

On each of the stator poles 34, a primary coil winding 40 is wound. The coil windings on alternate stator poles 34 are wound in the opposite direction so that when the coils are energized, magnetic fields having alternating north and south magnetic polarities will be generated at the successive pole pieces 34. Each pole piece 34 is provided with a plurality of pole piece teeth 36 extending toward the radial center of the ring 32. The rotor 38 has a plurality of radially outwardly extending teeth 39 which are juxtaposed to the teeth 36.

Between each pole piece 34 is a stator pole piece 42 extending radially inwardly from the ring 32. A coil 44 is wound on each pole piece 42 and the coils 44 are connected in three phases, denoted A, B or C as indicated. In operation, the coils 40, wound on each pole piece 34, act as primary windings and the coils 44 wound on pole pieces 42 act as secondary windings. Thus, every other outside stator winding 40 is a primary winding and every other outside stator winding 44 is a secondary winding. The dotted lines and arrows in FIG. 2 show the lines of magnetic flux for the A and C phases. It can be seen, for example, that phase C is at a null position because the C winding 44 is picking up signals of equal magnitude from the windings 40 on either side and the magnetic flux generated by each of these windings 40 is cancelling the magnetic flux of the other at the secondary winding 44. As in the embodiment depicted in FIG. 1, this synchro/resolver is a differential device and the magnetic coupling difference is impressed upon the secondary windings 44.

One difference between the embodiment of FIG. 1 and the embodiment of FIG. 2 is that in the embodiment of FIG. 1, the primaries are one third of a tooth pitch non-aligned, with the secondaries between them, whereas in the embodiment of FIG. 2, the primary windings are two thirds of a tooth pitch non-aligned with the secondary between them. This difference does not affect the operation of the synchro/resolver because of the differential pick-up operation. The resolver depicted in FIG. 2 is, however, not as accurate because not as many secondary windings can be used to average out mechanical errors. This is evident because in the embodiment of FIG. 1 there are six windings per phase whereas there are only two windings per phase in the embodiment of FIG. 2. Also, in the embodiment of FIG. 2 the resolver wastes two sets of poles because they are not evenly divisible by three. Twenty four poles would be a better number for the embodiment of FIG. 2. A common disadvantage to both types of resolvers is that the output signal is lower than for a conventional resolver and must be amplified to be compatible with conventional resolving circuitry.

Referring now to FIG. 3, as mentioned above, the synchro/resolver of the invention is conveniently made from the same laminae used for assembling the motor 46 to which the synchro/resolver is attached. This allows the rotor 12 of the resolver, for example, to be integrally assembled as part of the rotor of the motor. Also the stator assemblies 10 and 14 can be easily mounted on the corresponding stator assemblies of the motor.

The terms and expressions which have been employed here are used as terms of description and not of limitations, and there is no intention, in the use of such terms and expressions of excluding equivalents of the features shown and described, or portions thereof, it being recognized that various modifications are possible within the scope of the invention claimed.

I claim:
1. Synchro/resolver apparatus comprising
   a stator assembly having a succession of pole pieces, each pole piece having a plurality of spaced apart pole piece teeth, a rotor having a plurality of pole piece teeth corresponding to the stator teeth and positioned juxtaposed to the stator poles, a plurality of primary windings, each being wound on a separate stator pole piece in such a fashion as to induce alternately polarized magnetic fields in each successive pole piece on which a primary winding is wound, and a plurality of secondary windings, each being wound on a separate stator pole piece intermediate the stator pole pieces on which the primary windings are wound.

2. Synchro/resolver apparatus as recited in claim 1 wherein the stator assembly is comprised of a first set and a second set of pole pieces, each on an opposite side of the rotor, the rotor having two sets of corresponding teeth, each set being juxtaposed to a separate one of the sets of stator pole piece teeth and wherein the primary windings are wound on the first set of stator pole pieces and the secondary windings are wound on the second set of stator pole pieces.

3. Synchro/resolver apparatus as recited in claim 1 wherein the stator assembly and the rotor are ring shaped.

4. Synchro/resolver apparatus as recited in claim 1 wherein the apparatus is integrally constructed with an electric motor having a laminated rotor and a laminated stator and further wherein the stator assembly and the rotor of the transducer apparatus are comprised of laminations having the same form as the laminations of the motor's stator and rotor.

5. Synchro/resolver apparatus as recited in claim 1 wherein the stator assembly is comprised of a single set of pole pieces arranged in a ring, the rotor is ring shaped and is concentric with respect to the stator assembly and has a plurality of teeth juxtaposed to the stator teeth, and wherein the primary windings are wound on alternate pole pieces and the secondary windings are wound on the in-between pole pieces.

6. Synchro/resolver apparatus as recited in claims 1, 2 or 5 wherein the primary coils are connected together in a plurality of phases.

* * * * *